United States Patent
Jung et al.

(10) Patent No.: US 8,275,389 B2
(45) Date of Patent: Sep. 25, 2012

(54) APPARATUS AND METHOD FOR DETERMINING OPERATION OF LOCATION UPDATE IN A BROADBAND WIRELESS COMMUNICATION SYSTEM

(75) Inventors: Sung-Beom Jung, Suwon-si (KR); Jae-Yeong Kwon, Suwon-si (KR); Soo-Yeul Oh, Seoul (KR); Pyeong-Hwan Wee, Seoul (KR); Sang-Jun Lee, Yongin-si (KR); Young-Hak Choi, Seoul (KR); Sang-Ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 789 days.

(21) Appl. No.: 12/337,088

(22) Filed: Dec. 17, 2008

(65) Prior Publication Data

US 2009/0156236 A1 Jun. 18, 2009

(30) Foreign Application Priority Data

Dec. 18, 2007 (KR) .......................... 10-2007-0133078

(51) Int. Cl.
*H04W 74/00* (2009.01)
*H04W 24/00* (2009.01)
*H04W 4/00* (2009.01)
*H04B 7/00* (2006.01)

(52) U.S. Cl. ...................... 455/455; 455/422.1; 455/524; 455/425; 370/328

(58) Field of Classification Search .................. 455/455, 455/422.1, 524, 425; 370/328
See application file for complete search history.

(56) References Cited

U.S. PATENT DOCUMENTS

| | | | |
|---|---|---|---|
| 7,636,577 B2 * | 12/2009 | Mohanty et al. | 455/458 |
| 7,885,224 B2 * | 2/2011 | Ryu et al. | 370/328 |
| 2007/0055778 A1 | 3/2007 | Park et al. | |
| 2009/0080351 A1 * | 3/2009 | Ryu et al. | 370/312 |
| 2010/0031110 A1 * | 2/2010 | Seok et al. | 714/748 |

FOREIGN PATENT DOCUMENTS

| | | |
|---|---|---|
| KR | 10-1997-0013885 A | 3/1997 |
| KR | 10-0162238 B1 | 12/1998 |
| KR | 10-2007-0008693 A | 1/2007 |
| KR | 10-2007-0023962 A | 3/2007 |

* cited by examiner

*Primary Examiner* — Nick Corsaro
*Assistant Examiner* — Ngan Pham Lu
(74) *Attorney, Agent, or Firm* — Jefferson IP Law, LLP

(57) ABSTRACT

An apparatus and method for determining operation of location update in a broadband wireless communication system are provided. The apparatus includes a receiver, an interpreter, and a determiner. In an idle mode, the receiver receives a paging advertisement message from a Base Station (BS). The interpreter identifies paging group identification information included in the paging advertisement message. The determiner determines one of execution and non-execution of a location update process due to a change of a paging group if the paging group identification information is different from paging group identification information included in a previously received paging advertisement message.

18 Claims, 4 Drawing Sheets

APPARATUS AND METHOD FOR DETERMINING OPERATION OF LOCATION UPDATE IN A BROADBAND WIRELESS COMMUNICATION SYSTEM

PRIORITY

This application claims the benefit under 35 U.S.C. §119 (a) of a Korean patent application filed in the Korean Intellectual Property Office on Dec. 18, 2007 and assigned Serial No. 10-2007-0133078, the entire disclosure of which is hereby incorporated by reference.

BACKGROUND OF THE INVENTION

1. Field of the Invention

The present invention relates to a broadband wireless communication system. More particularly, the present invention relates to an apparatus and method for determining execution or non-execution of a location update process caused by a variation of a paging group in a broadband wireless communication system.

2. Description of the Related Art

In the 4$^{th}$ Generation (4G) communication system, which is a next generation communication system, intensive research is being conducted to provide users with services having various Qualities-of-Service (QoSs) at a data rate of about 100 Mbps. In particular, a study of the 4 G communication system is being made to support high-speed services as a way of guaranteeing mobility and QoS for a Broadband Wireless Access (BWA) communication system such as a wireless Local Area Network (LAN) system and a wireless Metropolitan Area Network (MAN) system. An exemplary 4 G communication system is an Institute of Electrical and Electronics Engineers (IEEE) 802.16 communication system.

In the 802.16 system, a plurality of Base Stations (BSs) compose a logical group called a paging group. The paging group is a unit representing a location of an idle mode Mobile Station (MS). That is, if there is a downlink traffic for an idle mode MS, all BSs within a paging group corresponding to the idle mode MS attempt to page the idle mode MS. The paging group is determined when a system is designed. The paging group is large enough to keep a moving idle mode MS within the same paging group during a defined amount of time and is small enough to keep a paging load at a desired level.

In order to inform an idle mode MS of a paging group the MS currently belongs to, all BSs periodically transmit MOBile PAGing ADVertisement (MOB_PAG ADV) messages including Paging Group IDentifiers (PG_IDs). The MOB_PAG_ADV messages include identification information on the BSs' own corresponding paging groups. Because the MOB_PAG_ADV message is transmitted through a predefined resource at a preset period, the idle mode MS can receive the MOB_PAG_ADV message. Accordingly, the idle mode MS determines if there is a change of a paging group by identifying the PG_ID included in the received MOB_PAG_ADV message and compares the identified PG_ID with a previously identified PG_ID. Upon determining that there is a change of a paging group, the idle mode MS performs a location update process as illustrated in FIG. 1. FIG. 1 is a ladder diagram illustrating a signal exchange occurring upon execution of a location update process in a broadband wireless communication system according to the conventional art. Referring to FIG. 1, the idle mode MS performs the location update process by receiving a MOB_PAG_ADV message and recognizing a change of a paging group in step 101. The idle MS then transmits a message for a location update (i.e., a RaNGing REQuest (RNG_REQ) message for the location update) to a BS in step 103. Thereafter, the idle MS receives a RaNGing ReSPonse (RNG_RSP) message from the BS in step 105.

FIGS. 2A and 2B illustrate examples of received signal strengths from a BS A and a BS B measured by an MS when the MS moves between cells of the BS A and the BS B which belong to different paging groups. In FIG. 2A, an MS experiences no problems with receiving a MOB_PAG_ADV message, recognizing a change of a paging group at timing A (211), transmitting an RNG_REQ message for a location update process to the BS B at timing B (213), and receiving an RNG_RSP message from the BS B at timing C (215). On the other hand, in FIG. 2B, an MS receives a MOB_PAG_ADV message, recognizes a change of a paging group at timing A (231) and transmits an RNG_REQ message to the BS B at timing B (233). However, the RNG_REQ message may be lost because of a deteriorated channel state at timing B (233). Alternately, although the RNG_REQ message is successfully received at timing B (233), an RNG_RSP message transmitted at timing C (235) may be lost. That is, the location update of the MS fulls.

As described above, when an idle mode MS performs a location update process when moving between cells, a variation of a channel state with a BS of a target cell may lead to a failure of the location update process. The aforementioned failure leads to an unnecessary power consumption of an MS and a waste of radio resources due to a loss of a message. Therefore, there is a need to improve a success rate of a location update process.

SUMMARY OF THE INVENTION

An aspect of the present invention is to address at least the above-mentioned problems and/or disadvantages and to provide at least the advantages below. Accordingly, an aspect of the present invention is to provide an apparatus and method for improving a location update success rate of an idle mode Mobile Station (MS) in a broadband wireless communication system.

Another aspect of the present invention is to provide an apparatus and method for determining execution or non-execution of a location update process in a broadband wireless communication system.

The above aspects are addressed by providing an apparatus and method for determining an operation of location update process in a broadband wireless communication system.

In accordance with one aspect of the present invention, a Mobile Station (MS) apparatus in a broadband wireless communication system is provided. The apparatus includes a receiver, an interpreter, and a determiner. In an idle mode, the receiver receives a paging advertisement message from a Base Station (BS). The interpreter identifies paging group identification information included in the paging advertisement message. The determiner determines one of execution and non-execution of a location update process due to on a change of a paging group if the paging group identification information is different from paging group identification information included in a previously received paging advertisement message.

In accordance with another aspect of the present invention, a method of operating a Mobile Station (MS) in a broadband wireless communication system is provided. The method includes, in an idle mode, receiving a paging advertisement message from a Base Station (BS), interpreting the paging advertisement message and identifying paging group identification information included in the paging advertisement message, and determining one of execution and non-execution of a location update process due to a change of a paging group if the paging group identification information is different from paging group identification information included in a previously received paging advertisement message.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A technology for determining execution or non-execution of a location update process in a broadband wireless communication system according to an exemplary embodiment of the present invention is described below. In the following description, an Orthogonal Frequency Division Multiple Access (OFDMA) wireless communication system is provided as an example. However, the present invention is applicable to other wireless communication systems as well.

Figure 1:
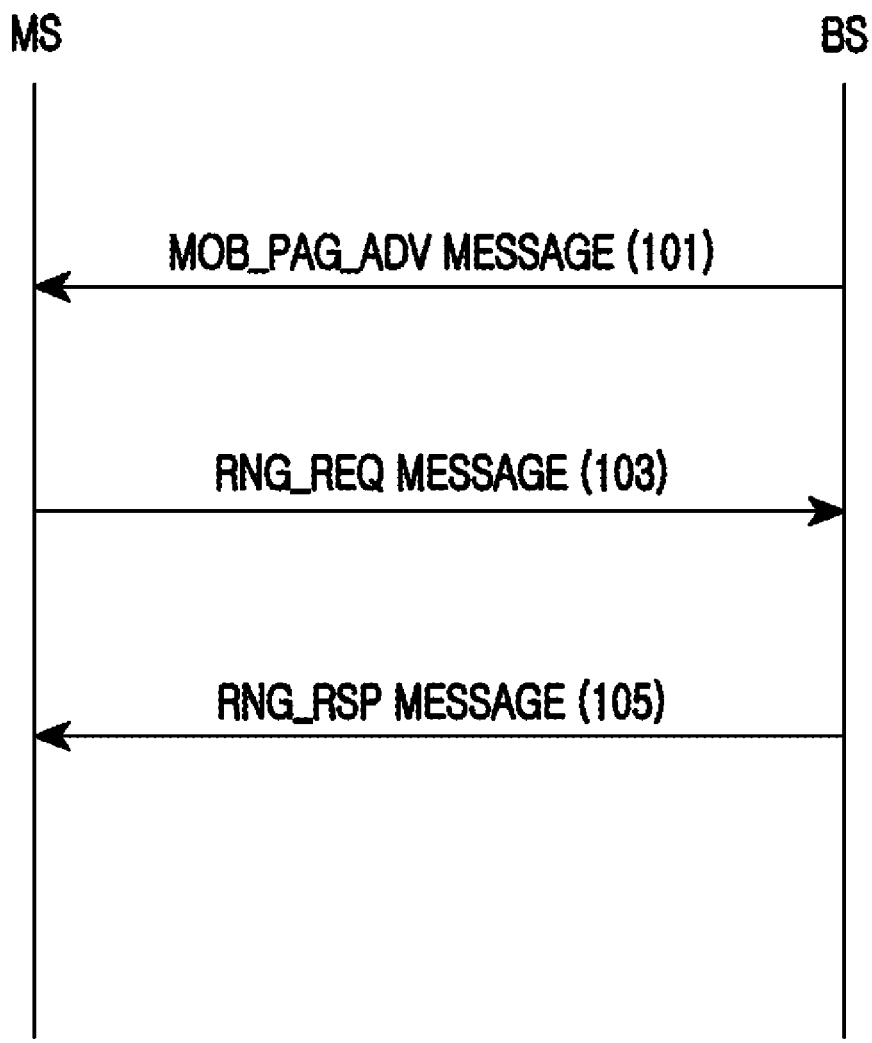
FIG. 1 is a ladder diagram illustrating a signal exchange occurring upon execution of a location update process in a broadband wireless communication system according to the conventional art.
Figure 2A:
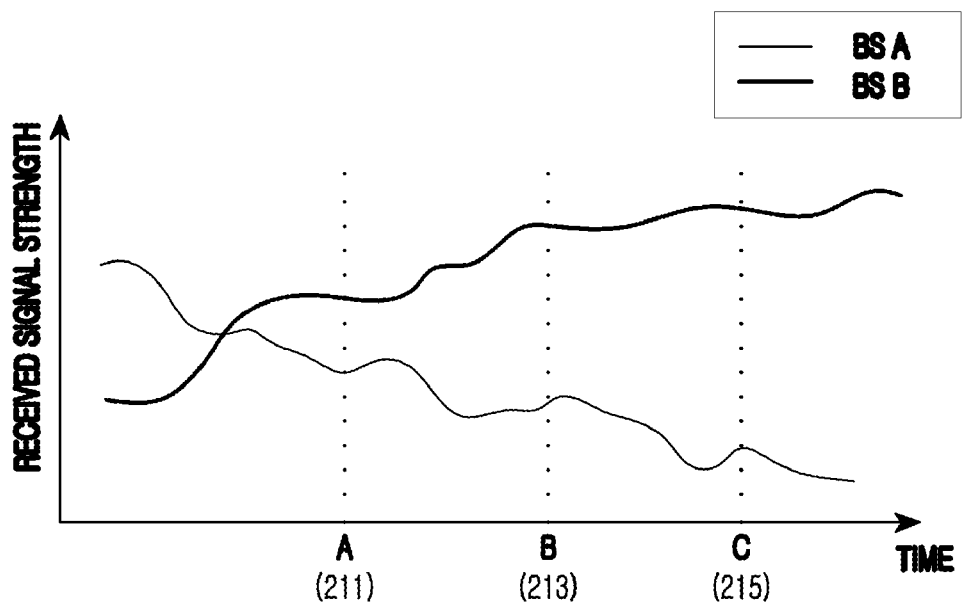
FIGS. 2A and 2B are graphs illustrating an example of a variation of a received signal strength from a Base Station (BS) measured by a Mobile Station (MS) moving between cells in a broadband wireless communication system according to the conventional art.
Figure 2B:
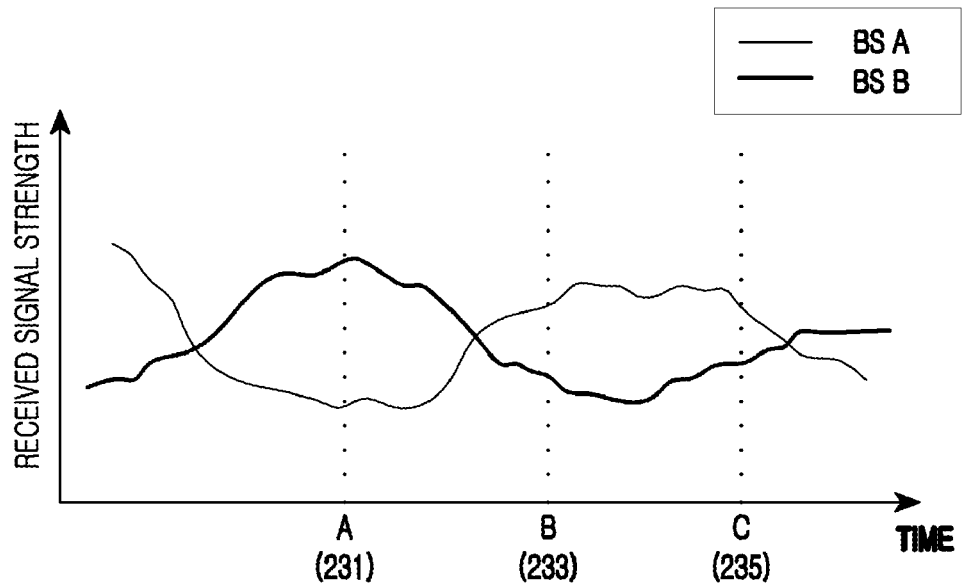
Figure 3:
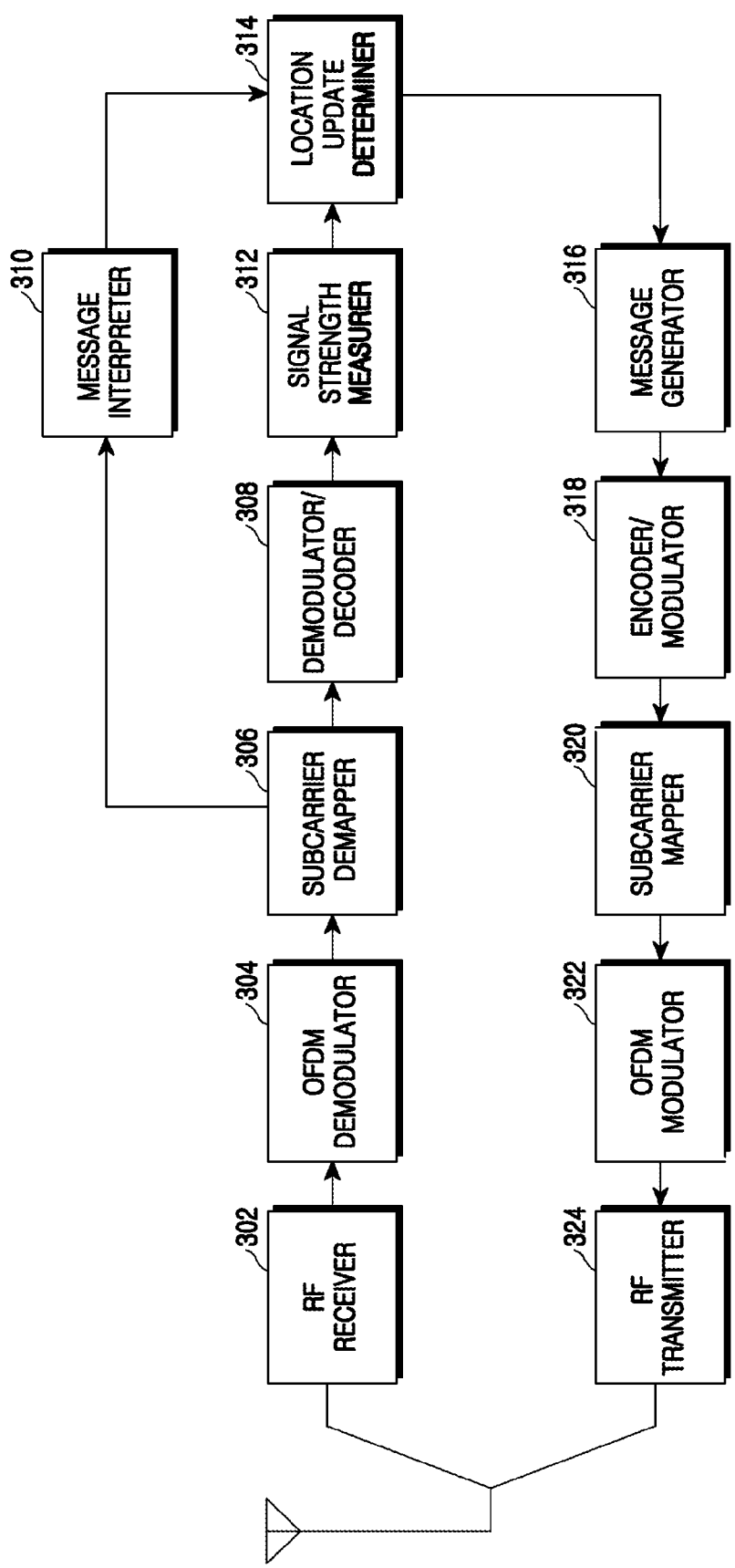
FIG. 3 is a block diagram illustrating a construction of an MS in a broadband wireless communication system according to an exemplary embodiment of the present invention.

FIG. 3 is a block diagram illustrating a construction of a Mobile Station (MS) in a broadband wireless communication system according to an exemplary embodiment of the present invention.

Referring to FIG. 3, the MS includes a Radio Frequency (RF) receiver 302, an Orthogonal Frequency Division Multiplexing (OFDM) demodulator 304, a subcarrier demapper 306, a demodulator/decoder 308, a message interpreter 310, a signal strength measurer 312, a location update determiner 314, a message generator 316, an encoder/modulator 318, a subcarrier mapper 320, an OFDM modulator 322, and an RF transmitter 324.

The RF receiver 302 may down convert an RF band signal received through an antenna into a baseband signal. The OFDM demodulator 304 may distinguish a signal provided from the RF receiver 302 on a per OFDM-symbol basis and may then remove a Cyclic Prefix (CP) and restore complex symbols mapped to a frequency domain through a Fast Fourier Transform (FFT) operation. The subcarrier demapper 306 may extract a signal mapped to resources allocated to the MS itself among the complex symbols mapped to the frequency domain. For example, when the MS is in idle mode, the subcarrier demapper 306 may extract a signal mapped to resources including a previously known paging advertisement message. The paging advertisement message may also be referred to as a MOBile PAGing ADVertisement (MOB_PAG_ADV) message. The demodulator/decoder 308 may demodulate and convert complex symbols into a bit stream and may channel decode the bit stream, thereby restoring an information bit stream.

The message interpreter 310 may interpret Media Access Control (MAC) management messages received from a Base Station (BS). For example, when the MS is in an idle mode, the message interpreter 310 may interpret a MOB_PAG_ADV message periodically received, thereby identifying a Paging Group IDentifier (PG_ID) included in the MOB_PAG_ADV message.

The signal strength measurer 312 may measure a strength of a signal received from a BS. For example, the signal strength measurer 312 may measure a Received Signal Strength Indication (RSSI) representing an absolute magnitude of a signal and a channel quality representing a relative magnitude of the signal. The channel quality may be determined based on one or more of a Carrier to Interference and Noise Ratio (CINR), a Signal to Interference and Noise Ratio (SINR), a Signal to Noise Ratio (SNR) and the like. More particularly, according to an exemplary embodiment of the present invention, if a PG_ID identified by the message interpreter 310 is different from a PG_ID included in a previously received MOB_PAG_ADV message, the signal strength measurer 312 may measure a signal strength for the BS having transmitted the MOB_PAG_ADV message. For the purpose of the signal strength measurement, the signal strength measurer 312 can use at least one of the MOB_PAG_ADV message and a preamble signal.

The location update determiner 314 may determine execution or non-execution of a location update process based on a PG_ID identified by the message interpreter 310. In particular, according to an exemplary embodiment of the present invention, if the PG_ID identified by the message interpreter 310 is different from a PG_ID included in a previously received MOB_PAG_ADV message, the location update determiner 314 may determine execution or non-execution of a location update process based on a signal strength measured by the signal strength measurer 312. More specifically, if recognizing a variation of a PG_ID, the location update determiner 314 may identify if an RSSI and a channel quality for the BS having transmitted the MOB_PAG_ADV message are more than or equal to respective threshold values. If the RSSI and the channel quality are more than or equal to respective threshold values, the location update determiner 314 may determine to perform a location update process. If the RSSI and the channel quality are less than the respective threshold values, the location update determiner 314 may determine not to perform the location update process and may wait to receive a next MOB_PAG_ADV message.

The message generator 316 may generate MAC management messages to be transmitted to a BS. In particular, according to an exemplary embodiment of the present invention, if the location update determiner 314 determines to perform a location update, the message generator 316 may generate a ranging message for the location update.

The encoder/modulator 318 may channel code an information bit stream and may modulate and convert the channel-coded bit stream into complex symbols. The subcarrier mapper 320 may map the complex symbols to a frequency domain. The OFDM modulator 322 may convert the complex symbols mapped to the frequency domain into a time domain signal through an Inverse Fast Fourier Transform (IFFT) operation, insert a CP, and generate an OFDM symbol. The RF transmitter 324 may up convert a baseband signal into an RF band signal and may transmit the converted RF band signal through the antenna.

Figure 4:
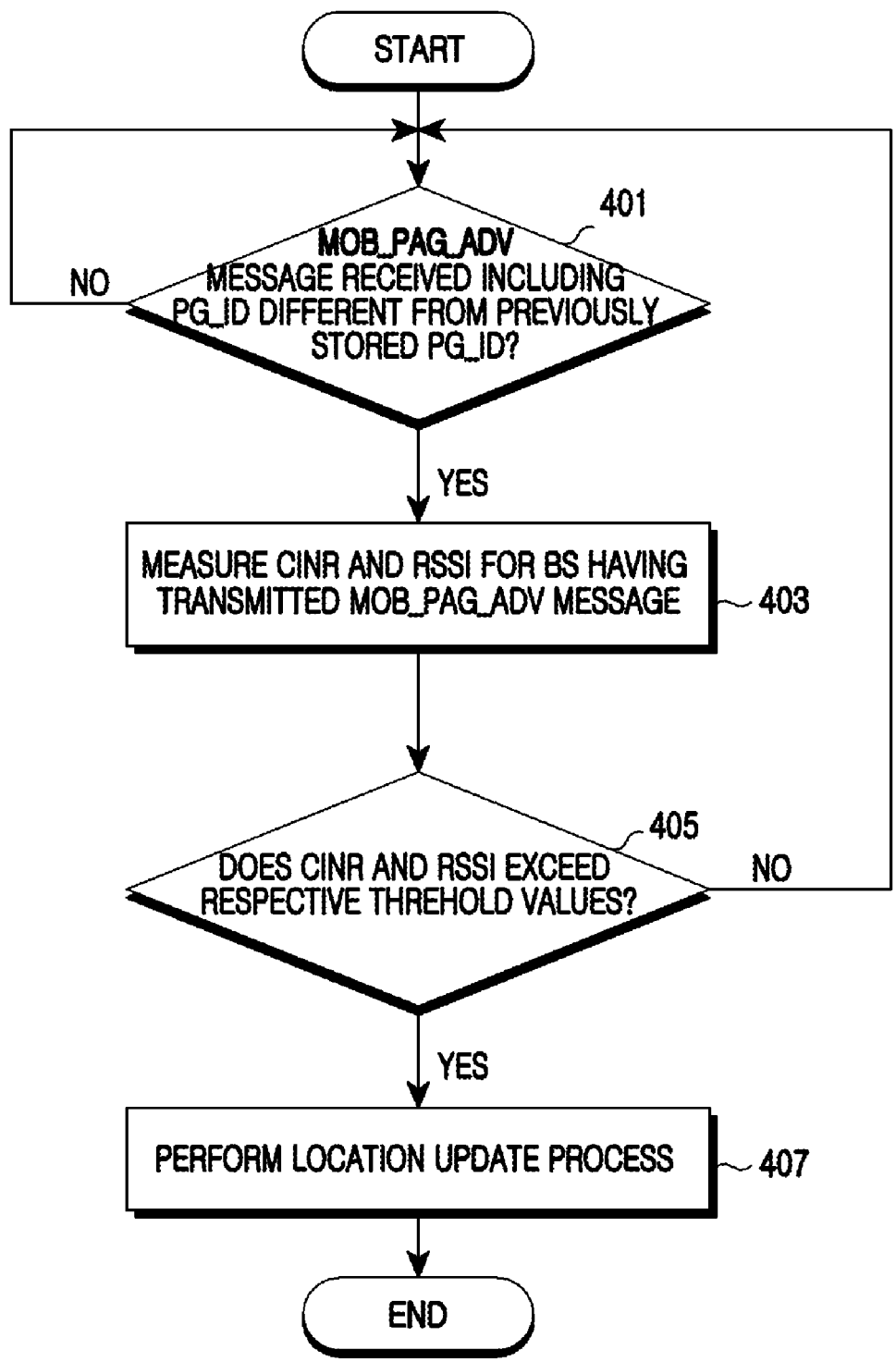
FIG. 4 is a flowchart illustrating a process of an operation of an MS in a broadband wireless communication system according to an exemplary embodiment of the present invention.

FIG. 4 is a flowchart illustrating a process of an operation of an MS in a broadband wireless communication system according to an exemplary embodiment of the present invention.

Referring to FIG. 4, in step 401, the MS may identify if it receives a MOB_PAG_ADV message including a PG_ID that is different from a previously stored PG_ID. That is, if receiving the MOB_PAG_ADV message, the MS may identify the PG_ID included in the MOB_PAG_ADV message and may then compare the identified PG_ID with a PG_ID included in a previous MOB_PAG_ADV message.

If there is a change of the PG_ID, in step 403, the MS may measure a channel quality and an RSSI for a BS having transmitted the MOB_PAG_ADV message. The channel quality may be determined using one or more of a CINR, an SINR, an SNR and the like. For the purpose of the signal strength measurement, the MS can use at least one of the MOB_PAG_ADV message and a preamble signal.

In step 405, the MS may identify if the measured channel quality and RSSI of step 403 are more than or equal to respective threshold values. If either the channel quality or the RSSI is less than each respective threshold value, the MS may return to step 401 without performing any additional operation. That is, the MS may wait to receive a next MOB_PAG_ADV message.

If the channel quality and the RSSI are more than or equal to respective threshold values, in step 407, the MS may perform a location update process. That is, the MS may generate a ranging message for a location update and may transmit the ranging message to the BS having transmitted the MOB_PAG_ADV message.

An exemplary embodiment of the present invention may enhance a success rate of a location update process by, prior to performing location update due to a change of a paging group, determining execution or non-execution of the location update process based on a signal strength with a BS in a broadband wireless communication system.

While the invention has been shown and described with reference to certain preferred embodiments thereof, it will be understood by those skilled in the art that various changes in form and details may be made therein without departing from the spirit and scope of the invention as defined by the appended claims and their equivalents.

What is claimed is:

1. An apparatus for a Mobile Station (MS) in a wireless communication system, the apparatus comprising:
   a receiver for receiving a paging advertisement message from a Base Station (BS) when the MS is in an idle mode;
   an interpreter for identifying paging group identification information included in the paging advertisement message; and
   a determiner for determining one of execution and non-execution of a location update process due to a change of a paging group based on at least one of a Received Signal Strength Indication (RSSI) and a channel quality, if the paging group identification information is different from paging group identification information included in a previously received paging advertisement message.

2. The apparatus of claim 1, further comprising a measurer for measuring the RSSI and the channel quality for the BS having transmitted the paging advertisement message.

3. The apparatus of claim 2, wherein the measurer measures the RSSI and the channel quality using at least one of the paging advertisement message and a preamble signal transmitted from the BS having transmitted the paging advertisement message.

4. The apparatus of claim 2, wherein, if the RSSI and the channel quality are less than respective threshold values, the determiner determines not to perform the location update process and waits to receive a next paging advertisement message.

5. The apparatus of claim 2, wherein, if the RSSI and the channel quality are more than or equal to respective threshold values, the determiner determines to perform the location update process.

6. The apparatus of claim 5, further comprising:
   a generator for, if it is determined to perform the location update process, generating a ranging message for the location update process; and
   a transmitter for transmitting the ranging message to the BS having transmitted the paging advertisement message.

7. The apparatus of claim 2, wherein the channel quality comprises at least one of a Carrier to Interference and Noise Ratio (CINR), a Signal to Interference and Noise Ratio (SINR), and a Signal to Noise Ratio (SNR).

8. The apparatus of claim 1, further comprising an Orthogonal Frequency Division Multiplexing (OFDM) demodulator for distinguishing a received signal on a per OFDM-symbol basis, for removing a Cyclic Prefix (CP), and for restoring a signal by subcarrier through a Fast Fourier Transform (FFT) operation.

9. The apparatus of claim 1, wherein the receiver periodically receives paging advertisement messages from the BS when the MS is in the idle mode.

10. A method of operating a Mobile Station (MS) in a broadband wireless communication system, the method comprising:

in an idle mode, receiving a paging advertisement message from a Base Station (BS);

interpreting the paging advertisement message and identifying paging group identification information included in the paging advertisement message; and determining one of execution and non-execution of a location update process due to a change of a paging group based on at least one of a Received Signal Strength Indication (RSSI) and a channel quality, if the paging group identification information is different from paging group identification information included in a previously received paging advertisement message.

11. The method of claim 10, further comprising measuring the RSSI and the channel quality for the BS having transmitted the paging advertisement message.

12. The method of claim 11, wherein the RSSI and the channel quality are measured using at least one of the paging advertisement message and a preamble signal transmitted from the BS having transmitted the paging advertisement message.

13. The method of claim 11, wherein the determining one of execution and non-execution of the location update process comprises:

if the RSSI and the channel quality are less than respective threshold values, determining not to perform the location update process; and waiting to receive a next paging advertisement message.

14. The method of claim 11, wherein the determining one of execution and non-execution of the location update process comprises, if the RSSI and the channel quality are more than or equal to respective threshold values, determining to perform the location update process.

15. The method of claim 14, further comprising, if it is determined to perform the location update process, transmitting a ranging message for the location update process to the BS having transmitted the paging advertisement message.

16. The method of claim 11, wherein the channel quality comprises at least one of a Carrier to Interference and Noise Ratio (CINR), a Signal to Interference and Noise Ratio (SINR), and a Signal to Noise Ratio (SNR).

17. The method of claim 10, further comprising:

distinguishing a received signal on a per OFDM-symbol basis;

removing a Cyclic Prefix (CP); and restoring a signal by subcarrier through a Fast Fourier Transform (FFT) operation.

18. The method of claim 10, wherein paging advertisement messages are periodically received from the BS.

* * * * *